(12) United States Patent
Lee et al.

(10) Patent No.: US 8,875,165 B2
(45) Date of Patent: Oct. 28, 2014

(54) COMPUTING DEVICE HAVING A DLL INJECTION FUNCTION, AND DLL INJECTION METHOD

(75) Inventors: Jong-Il Lee, Goyang Si (KR); Nam-Su Yi, Seoul (KR)

(73) Assignee: Fasoo.com Co., Ltd, Seoul (KR)

( * ) Notice: Subject to any disclaimer, the term of this patent is extended or adjusted under 35 U.S.C. 154(b) by 0 days.

(21) Appl. No.: 14/113,249

(22) PCT Filed: Mar. 12, 2012

(86) PCT No.: PCT/KR2012/001775
§ 371 (c)(1),
(2), (4) Date: Oct. 22, 2013

(87) PCT Pub. No.: WO2012/148080
PCT Pub. Date: Nov. 1, 2012

(65) Prior Publication Data
US 2014/0047461 A1    Feb. 13, 2014

(30) Foreign Application Priority Data

Apr. 28, 2011 (KR) ........................ 10-2011-0039901

(51) Int. Cl.
G06F 13/00 (2006.01)
G06F 9/445 (2006.01)

(52) U.S. Cl.
CPC .................................. *G06F 9/44521* (2013.01)
USPC .......................................... 719/331; 719/332

(58) Field of Classification Search
CPC .................................................. G06F 9/44521
USPC .................................................. 719/331, 332
See application file for complete search history.

(56) References Cited

U.S. PATENT DOCUMENTS

| 6,141,698 A | 10/2000 | Krishnan et al. |
| 6,463,583 B1 | 10/2002 | Hammond |
| 7,984,429 B2 * | 7/2011 | Hunt .............................. 717/130 |
| 8,769,268 B2 * | 7/2014 | Morozov et al. .............. 713/164 |
| 2012/0167057 A1 * | 6/2012 | Schmich et al. .............. 717/130 |

FOREIGN PATENT DOCUMENTS

JP    2011013955 A    1/2011

* cited by examiner

*Primary Examiner* — Andy Ho
(74) *Attorney, Agent, or Firm* — William Park & Associates Patent Ltd.

(57) ABSTRACT

Provided are a computing device provided with a DLL injection function and a DLL injection method. When receiving from an operating system notification of whether a target process corresponding to a program ordered by a user to be executed is created, a process creation module of an injection program executes a launcher process to create the target process as a child process of the launcher process and sets the target process to a suspend mode. A code insertion module receives allocation of a memory region where the target process is stacked, using a process handle of the target process, to insert a code for executing a DLL file to be injected into the target process. A restoration module cancels the suspend mode of the target process to allow the target process to be executed. According to the present invention, it is possible to stably perform DLL injection without confliction with another DLL injection technique by inserting a DLL executable code into the memory region of the target process which is created in the suspend mode.

8 Claims, 5 Drawing Sheets

COMPUTING DEVICE HAVING A DLL INJECTION FUNCTION, AND DLL INJECTION METHOD

TECHNICAL FIELD

The present disclosure relates to a computing device provided with a DLL injection function, and a DLL injection method, and more particularly, to a device and method for performing DLL injection when a launcher is executed and then a target process is executed as a child process of the launcher.

BACKGROUND ART

DLL injection means that a specific DLL is forced to be inserted into another process. That is, DLL injection allows the forcibly inserted DLL to be loaded and processed during the execution of the other process. DLL injection is used in several fields such as a virus and malicious code, including a rootkit. The forcibly inserted DLL may have an access privilege to a memory of the corresponding process, thereby easily controlling the process by hooking and adding of a function.

A conventional representative DLL injection technique includes a method of using SetWindowsHookEx( ) function, a method of using CreateRemoteThread( ) function, and a method of editing a registry value. In the conventional representative DLL injection method, when a user starts a process, the process is stacked in a memory, and DLL injection is performed while the stacked process is executed.

Thus, the conventional DLL injection techniques may conflict with each other as they are simultaneously applied to the same process, and a DLL injection time may vary depending on an operating environment, and depending on an operating time even in the same environment.

DISCLOSURE

Technical Problem

Therefore, an object of the present invention is to provide a computing device provided with a DLL injection function and a DLL injection method, which have higher stability than the conventional DLL injection technique and no probability to conflict with another DLL injection technique.

Another object of the present invention is to provide a computer-readable recording medium configured to store a computer program to be executed on a computer for the computing device provided with a DLL injection function and the DLL injection method, which have higher stability than the conventional DLL injection technique and no probability to conflict with another DLL injection technique.

Technical Solution

To achieve these and other advantages and in accordance with the purpose(s) of the present invention as embodied and broadly described herein, a computing device in accordance with an aspect of the present invention includes: a processor configured to execute an operating system and an injection program for performing DLL injection on a target process; and a memory configured to store the operating system, the injection program, and the target process, wherein the injection program includes: a process creation module configured to execute a launcher process to create the target process as a child process of the launcher process and set the target process to a suspend mode; a code insertion module configured to receive allocation of a memory region where the target process is stacked using a process handle of the target process to insert a code for executing a DLL file to be injected into the target process; and a restoration module configured to cancel the suspend mode of the target process to allow the target process to be executed.

To achieve these and other advantages and in accordance with the purpose(s) of the present invention, a DLL injection method in accordance with another aspect of the present invention includes: (a) receiving from an operating system notification of whether a target process corresponding to a program ordered to be executed by a user is created; (b) executing a launcher process to create the target process as a child process of the launcher process and set the target process to a suspend mode; (c) receiving allocation of a memory region where the target process is stacked using a process handle of the target process to insert a code for executing a DLL file to be injected into the target process; and (d) canceling the suspend mode of the target process to allow the target process to be executed.

Advantageous Effects

In the computing device provided with a DLL injection function and the DLL injection method according to the present invention, it is possible to stably perform DLL injection without confliction with another DLL injection technique by inserting a DLL executable code into a memory region of a target process which is created in a suspend mode. It is also possible to prevent another process for performing DLL injection from being executed instead of a target process by executing the target process with a system privilege.

BEST MODE

Hereinafter, a computing device provided with a DLL injection function, and a DLL injection method according to a preferred embodiment of the present invention will be described in detail with reference to the accompanying drawings.

Figure 1:
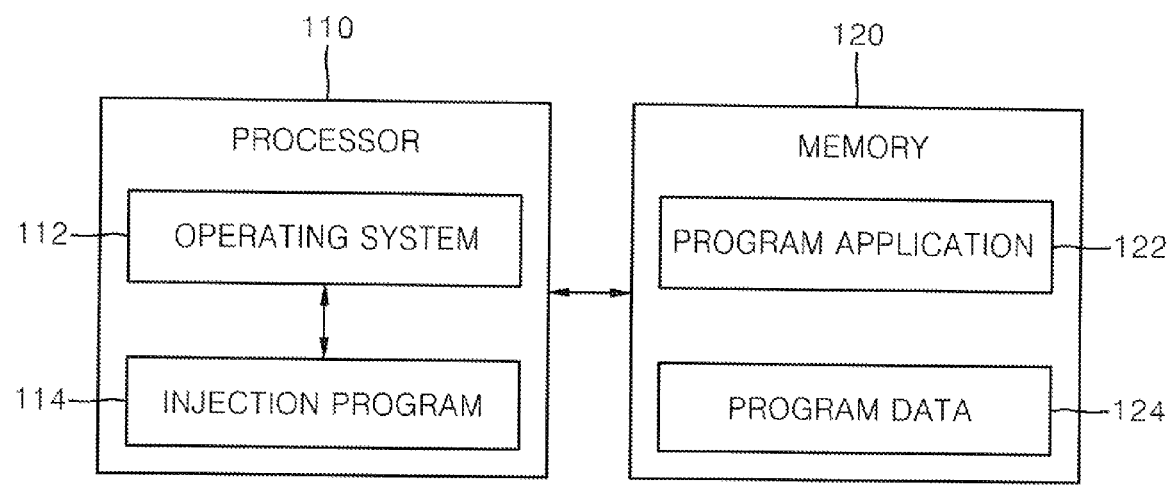
FIG. 1 is a block diagram showing a configuration of a computing device provided with a DLL injection function according to a preferred embodiment of the present invention.

FIG. 1 is a block diagram showing a configuration of a computing device provided with a DLL injection function according to a preferred embodiment of the present invention.

Referring to FIG. 1, the computing device provided with a DLL injection function according to the present invention includes a processor 110 and a memory 120.

In particular, the processor 110 is a hardware device for executing software stored in the memory 120. Also, the processor 110 may be any application specific or commercial processor, a central processing unit (CPU), a coprocessor of some processors associated with a computer, a semiconductor based microprocessor, a macro processor, or any device for executing software commands.

As shown in FIG. 1, the processor 110 may execute an operating system 112, and the operating system 112 may be stored in the memory 120. Also, the processor 110 retrieves and executes a computer program instruction from a program application 122 stored in the memory 120, and executes an injection program 114. In this case, the injection program 114 may be implemented in a form of a driver and thus automatically executed through registry setting at an appropriate time while the operating system 112 is booted, and may be implemented as one element of a common program application.

The memory 120 may include any one of volatile memory elements, such as RAM (DRAM, SRAM, and SDRAM), and non-volatile memory elements, such as ROM, erasable programmable read-only memory (EPROM), electrically erasable programmable read-only memory (EEPROM), programmable read-only memory (PROM), tape, compact disc read-only memory (CD-ROM), disk, diskette, cartridge, cassette, etc., and a combination thereof. Furthermore, the memory 120 may adopt an electrical, magnetic, optical, and/or other types of storage media. The memory 120 may have a distributed architecture having various components spaced apart from each other, and may be accessed by the processor 110.

Also, the memory 120 shown in FIG. 1 may store program data 124 such as documents, multimedia files, and data files. Furthermore, the injection program 114 may use a portion of the memory 120. As such, the software stored in the memory 120 may include one or more individual programs, each of which includes a list of executable commands aligned to implement a logical function.

Figure 2:
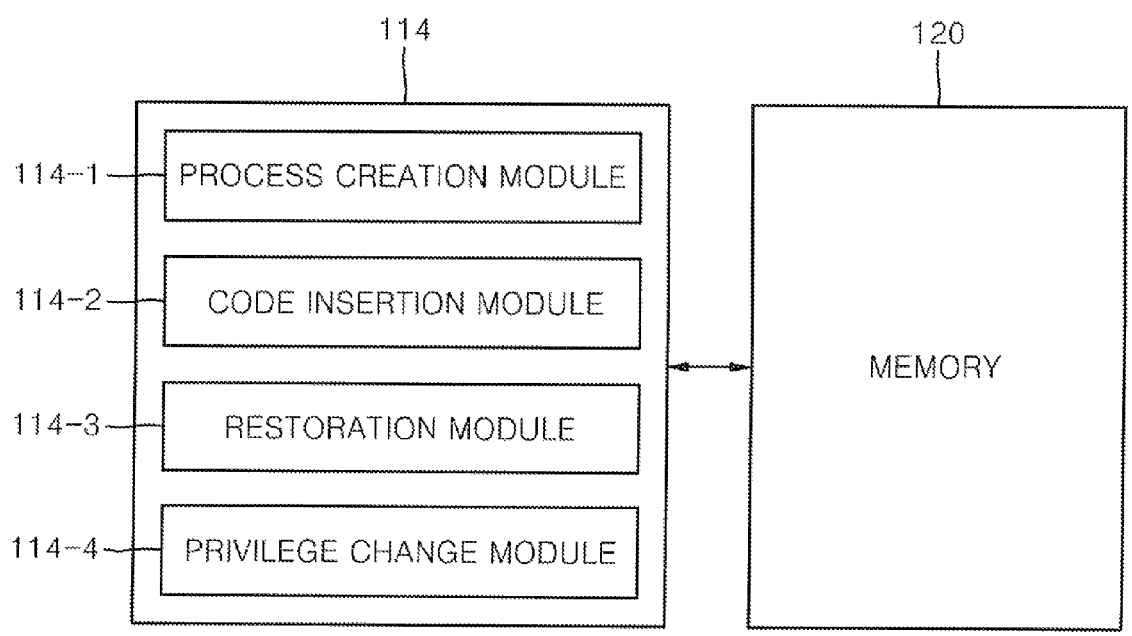
FIG. 2 shows a configuration of an injection program.

The injection program 114 of FIG. 1 is intended to perform DDL injection on a target process, and a configuration of the injection program 114 is shown in FIG. 2. Referring to FIG. 2, the injection program 114 includes a process creation module 114-1, a code insertion module 114-2, and a restoration module 114-3, and performs DLL injection before the target process is completed.

In the conventional DLL injection method, when a process execution command is input from a user, a corresponding process is stacked and then executed in a memory, and DLL injection is performed. However, as described above, the conventional DLL injection technique has a possibility to be failed or conflict with another DLL injection technique.

Accordingly, the injection program 114 proposed by the present invention may execute a launcher process to execute the target process as a child process, and may insert an injection code indicating a path of a DLL file into a memory region where a target process is stacked, thus performing DLL injection before the target process is executed.

The process creation module 114-1 executes a launcher process to create a target process as a child process of the launcher process and sets the created target process to a suspend mode. This is intended to insert an injection code before the process is completed while the target process is stacked in a memory in order to be executed. Also, since the target process is created as the child process of the launcher process, the process creation module 114-1 inputs an 'execution process path' and 'execution process parameter' to create the child process.

As such, the injection program 114 proposed by the present invention may insert the injection code into the memory region of the target process that is in the suspend mode and then cancel the suspend mode to allow the target process to be executed, thus adjusting the DLL injection time to prevent the DLL injection from being failed.

Next, the code insertion module 114-2 receives allocation of the memory region where the target process is stacked, using a process handle of the target process, to insert an injection code (Load DLL Code) indicating a path of the DLL file to be injected.

Figure 3:
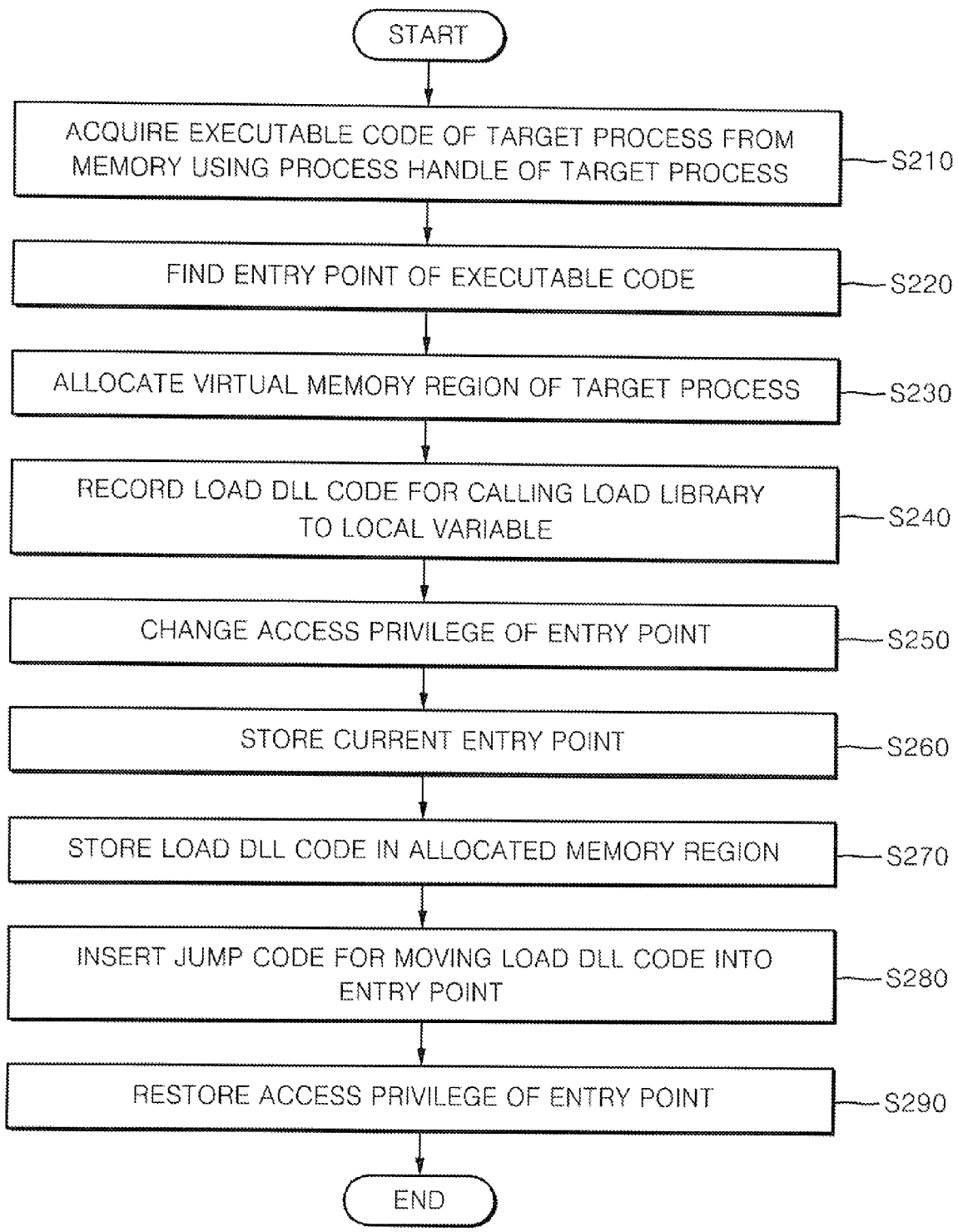
FIG. 3 is a flowchart showing a process of inserting an injection code performed by a code insertion module.

FIG. 3 is a flowchart showing a process of inserting an injection code performed by the code insertion module.

Since the target process is created by the process creation module 114-1 as a child process, the code insertion module 114-2 has a privilege to directly access the memory region of the target process. Accordingly, the code insertion module 114-2 finds a position where the target process is stacked in the memory 120, using the process handle obtained by a process of creating the target process, and reads an executable code from the position in operation S210.

Figure 4:
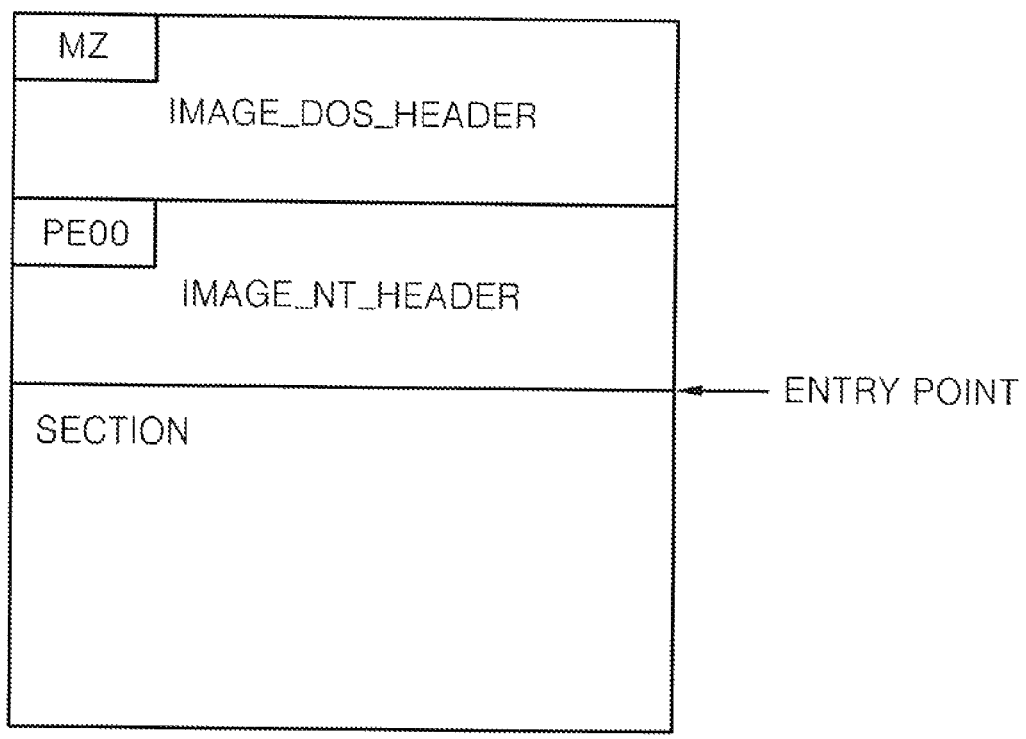
FIG. 4 shows a configuration of a PE structure.

The executable code read by the code insertion module 114-2 has a portable executable (PE) structure that is an executable file format supported by Microsoft. FIG. 4 shows a configuration of the PE structure. The code insertion module 114-2 checks whether first two bytes of IMAGE_DOS_HEADER of the configuration shown in FIG. 4 are IMAGE_DOS_SIGNATURE (character MZ) in order to check whether the executable code is in the PE structure. Also, the code insertion module 114-2 checks whether first four bytes of IMAGE_NT_HEADER are IMAGE_NT_SIGNATURE (characters PE00). As a result, when it is checked that the executable code has the PE structure, the code insertion module 114-2 finds an entry point from the PE structure in operation S220.

Next, the code insertion module 114-2 is allocated a portion of a process virtual memory region using the process handle in operation S230. The allocated memory region is a space for storing Load DLL Code to be inserted later. Also, the code insertion module 114-2 writes Load DLL Code for calling LoadLibrary and returning to an original entry point and records Load DLL Code to a local variable in operation S240.

To allow Load DLL Code to be executed in a process of executing the target program by changing the entry point of the executable code, the privilege to access the entry point should be changed to a writable state in operation S250. Also, the code insertion module 114-2 stores a before-changed current entry point in BackupEntry which is a portion of the local variable previously created, in order to returning to the original entry point after Load DLL Code is executed.

Next, the code insertion module 114-2 inserts Load DLL Code stored in the local variable into the allocated virtual memory region in operation S270 and inserts Jump Code for moving to a position of Load DLL Code into the entry point that is changed to the writable state in operation S280.

According to the above described process, a process of inserting Load DLL Code for DLL injection is completed. Finally, the code insertion module 114-2 restores a privilege to access the entry point to an original state in operation S290. As such, the restoration module 114-3 cancels the suspend mode of the target process to allow the target process to be normally executed after Load DLL Code is inserted into the memory region of the target process. In this case, the injected DLL is executed together with the target process because of Load DLL Code inserted by the code insertion module 114-2 into the memory region of the target process.

The purpose of the injection program 114 executing the target process in a suspend mode to perform DLL injection is to prevent the DLL injection from conflicting with another DLL injection technique and thus stably perform DLL injection. To this end, as described above, the target process needs to be protected from another DLL injection technique, and in addition the DLL injection times should be different.

In a general DLL injection scheme, when the target process is executed with a user privilege, a process attempting DLL injection executed with the same user privilege senses the execution of the target process and attempts the DLL injection. Accordingly, the DLL injection succeeds, and the injected DLL is loaded and executed together when the target process is executed.

The injection program 114 proposed by the present invention further includes a privilege change module 114-4 to execute the target process with a system privilege in order to protect the target process from DLL injection by a process executed with a user privilege. In this way, general DLL injection processes fails in DLL injection to a process having a high privilege, and the injection program 114 may prevent another DLL injection technique from being applied to the target process while stably performing DLL injection.

Figure 5:
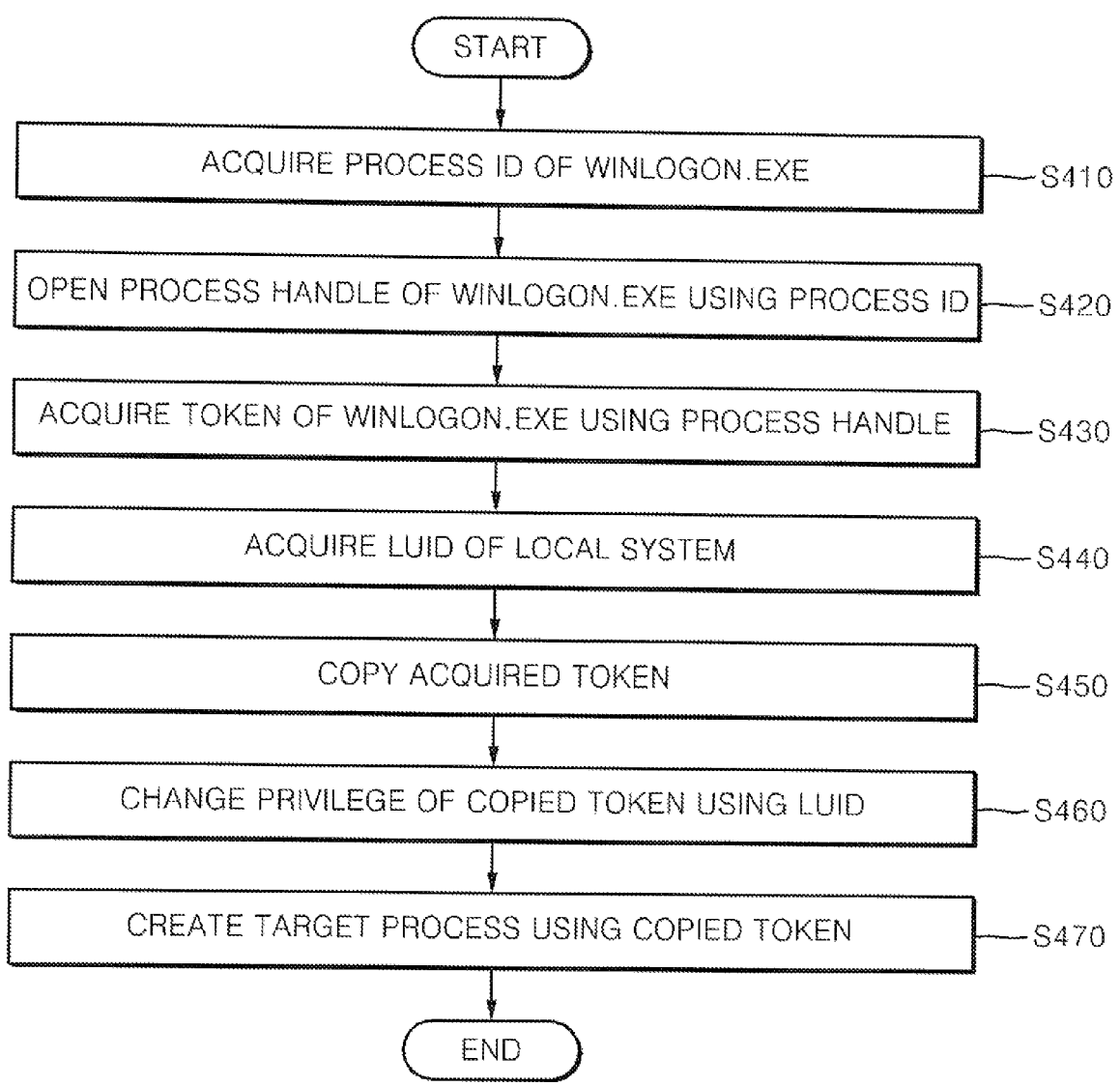
FIG. 5 is a flowchart showing a process of allowing a target program to be executed with a system privilege by a privilege change module.

FIG. 5 is a flowchart showing a process of allowing a target program to be executed with a system privilege by a privilege change module 114-4.

Referring to FIG. 5, the privilege change module 114-4 acquires an ID of a process that is always executed with a system privilege in all windows operating systems, for example, 'winlogon.exe', in operation S410. To acquire the ID of the process, a snapshot scheme of Tool Help library provided by Microsoft Inc. to acquire the process information is used.

Next, the privilege change module 114-4 opens a process handle of 'winlogon.exe' using the acquired process ID in operation S420 and opens a token of 'winlogon.exe' using the process handle in operation S430. One token includes security information about a logon session, and a user copies one token made when logging on to an operating system to execute all processes executed by the user.

In a windows operating system, privileges are managed using a session in order to independently manage respective users. Basically, one user is allocated one session when logging on, and performs a work within the allocated session. In a similar manner to the session allocated to a user logging on, a system having a highest privilege is also allocated a session, and performs an important work inside the operating system.

Accordingly, the privilege change module 114-4 acquiring a token of 'winlogon.exe' executed with a system privilege means acquiring a privilege to enter the target process into a session allocated to the system.

Next, the privilege change module 114-4 copies the acquired token to create a new token in operation S450. The copied token contains a system privilege of 'winlogon.exe'. Also, the privilege change module 114-4 acquires LUID, which is a value for identifying the current local system in operation S440, and changes a privilege in order to use the copied token in operation S460.

Finally, the privilege change module 114-4 allows the process creation module 114-1 to create the target process using the copied token in operation S470. In this case, a desired process may be created by setting a process path and a process parameter. Also, in the present invention, it has already been described that the target process is created as a child process of the DLL injection apparatus according to the present invention. The process creation module 114-1 may execute a launcher process, instead of the target process, with a system privilege using a process ID of a process operated with a system privilege in an operating system, and thus may execute the target process, which is the child process, with the system privilege.

Subsequently, the target process is executed with the system privilege. The code insertion module 114-2 is independent of the DLL injection by an external process and inserts Load DLL Code into a memory region where the target process is stacked, to allow a desired DLL to be executed.

The DLL injection defense technique of the privilege change module 114-4 as described above may analyze a DLL injection technique to monitor occurrence of DLL injection, thereby fundamentally defending the target process against the DLL injection.

Figure 6:
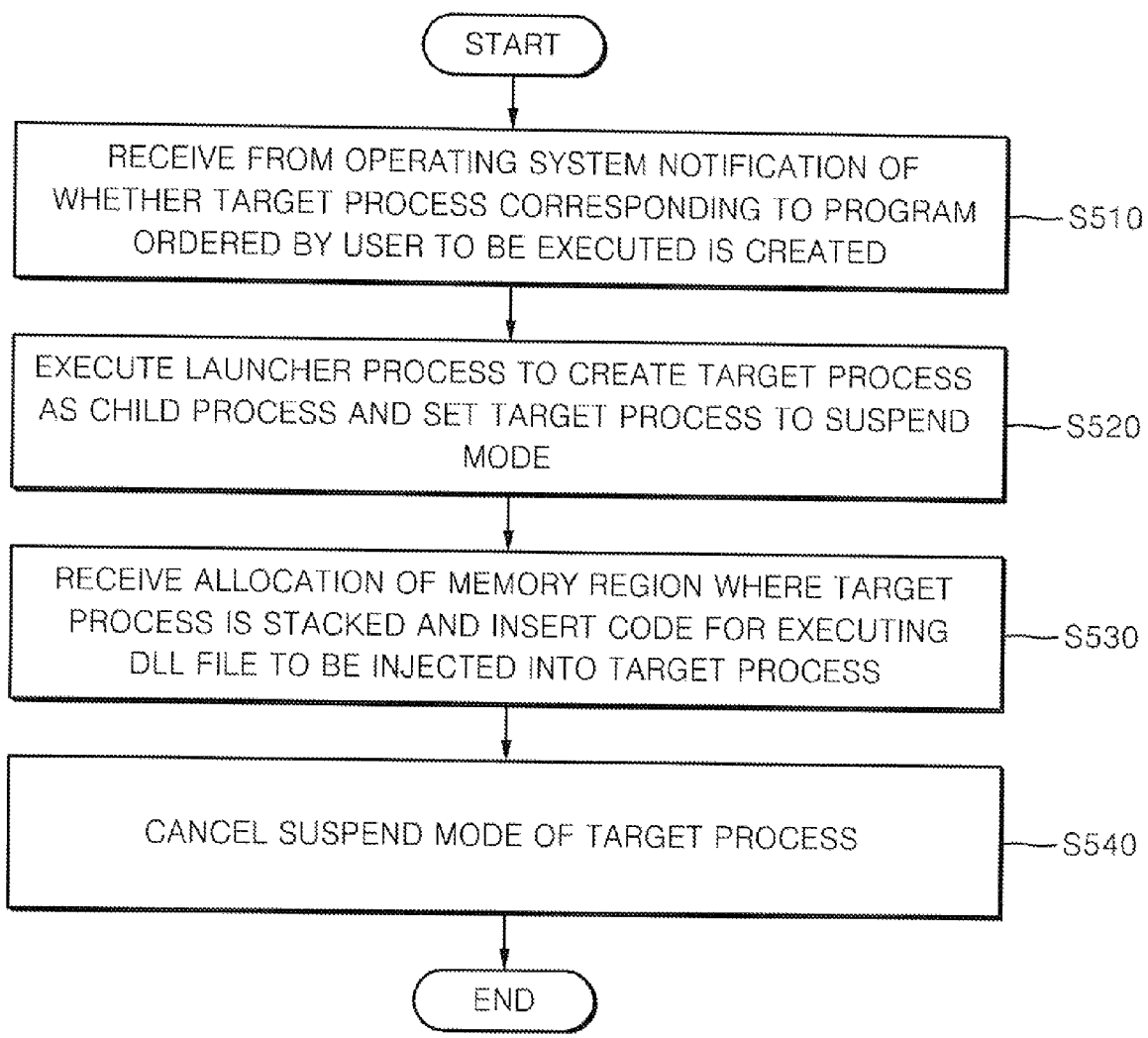
FIG. 6 is a flowchart showing a DLL injection method according to a preferred embodiment of the present invention.

FIG. 6 is a flowchart showing a DLL injection method according to a preferred embodiment of the present invention.

Referring to FIG. 6, when receiving from the operating system 112 notification of whether a target process corresponding to a program ordered by a user to be executed is created in operation S510, the process creation module 114-1 of the injection program 114 executes a launcher process to create the target process as a child process of the launcher process and sets the created target process to a suspend mode in operation S520. In this case, as described above, the privilege change module 114-4 may copy a token of 'winlogon.exe' executed with a system privilege to allow the target process to be created with a system privilege.

Next, the code insertion module 114-2 receives allocation of the memory region where the target process is stacked, using a process handle of the target process, to insert a code for executing a DLL file to be injected into the target process in operation S530. Detailed operations of the code insertion module 114-2 are the same as described above with reference to FIG. 3.

When the code insertion module 114-2 inserts Load DLL Code for executing the DLL file into the memory region of the target process, the restoration module 114-3 cancels the suspend mode of the target process to allow the target process to be executed in operation S540.

The invention can also be embodied as computer-readable codes on a computer-readable recording medium. The computer-readable recording medium is any data storage device that can store data which can be thereafter read by a computer system. Examples of the computer-readable recording medium include a ROM, a RAM, a CD-ROM, a magnetic tape, a floppy disk, and an optical data storage device. Further, the recording medium may be implemented in the form of carrier waves such as Internet transmission. The computer-readable recording medium can also be distributed over computer systems connected through a wired/wireless communication network so that the computer-readable code is stored and executed in a distributed fashion.

While the present invention has been particularly shown and described with reference to preferred embodiments thereof, it should not be construed as being limited to the embodiments set forth herein. It will be understood by those skilled in the art that various changes in form and details may be made to the described embodiments without departing from the spirit and scope of the present invention as defined by the following claims.

The invention claimed is:
1. A computing device comprising:
a processor configured to execute an operating system and an injection program for performing DLL injection on a target process; and
a memory configured to store the operating system, the injection program, and the target process, wherein the injection program comprises:

a process creation module configured to execute a launcher process to create the target process as a child process of the launcher process and set the target process to a suspend mode;

a code insertion module configured to receive allocation of a memory region where the target process is stacked using a process handle of the target process to insert a code for executing a DLL file to be injected into the target process; and a restoration module configured to cancel the suspend mode of the target process to allow the target process to be executed.

2. The computing device of claim 1, wherein the injection program further comprises a privilege change module configured to allow the target process to be executed with a system privilege using a process ID of a process operated with a system privilege in the operating system.

3. The computing device of claim 2, wherein the privilege change module opens a token by a process handle acquired using the process ID of the process operated with a system privilege in the operating system and copies the token, and the process creation module creates the target process using the copied token.

4. The computing device of claim 1, wherein the process creation module allows the launcher process to be executed with a system privilege using a process ID of a process operated with a system privilege in the operating system.

5. A DLL injection method comprising the steps of:
(a) receiving from an operating system notification of whether a target process corresponding to a program ordered to be executed by a user is created;
(b) executing a launcher process to create the target process as a child process of the launcher process and set the target process to a suspend mode;
(c) receiving allocation of a memory region where the target process is stacked using a process handle of the target process to insert a code for executing a DLL file to be injected into the target process; and
(d) canceling the suspend mode of the target process to allow the target process to be executed.

6. The DLL injection method of claim 5, further comprising the step of (e) allowing the target process to be executed with a system privilege using a process ID of a process operated with a system privilege in the operating system, between step (a) and step (b).

7. A non-transitory computer-readable media having recorded thereon a program for executing the DLL injection method of claim 5.

8. A non-transitory computer-readable media having recorded thereon a program for executing the DLL injection method of claim 6.

* * * * *